Jan. 15, 1952
A. RATNER
2,582,355
DATE-REMINDER SHEET
Filed Oct. 13, 1950
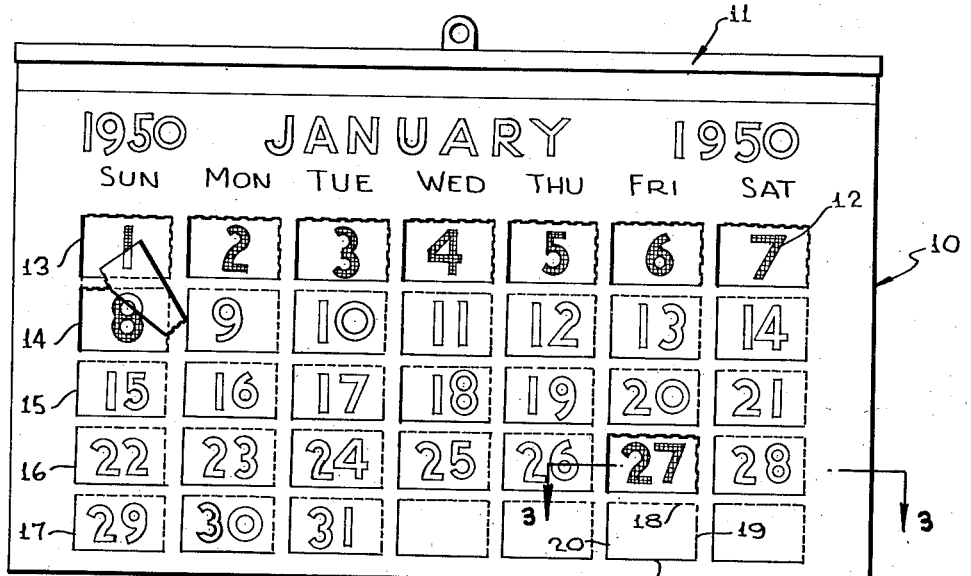
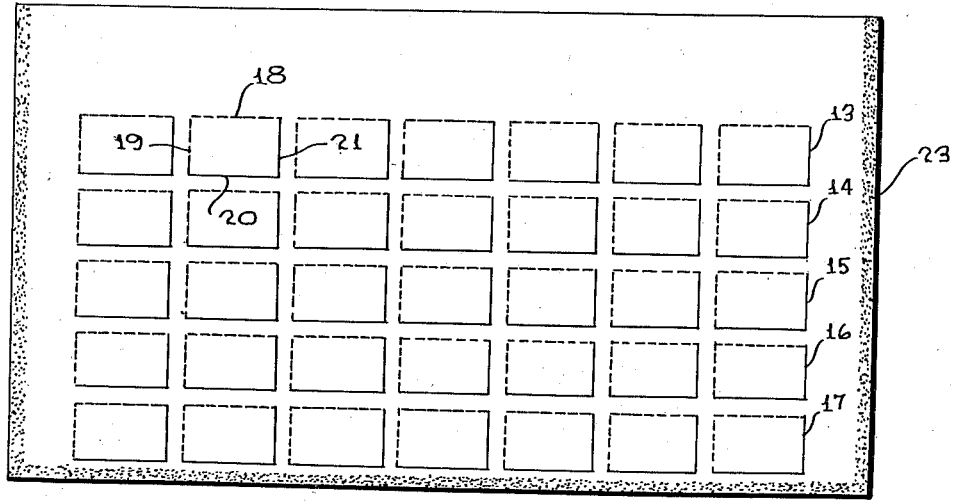
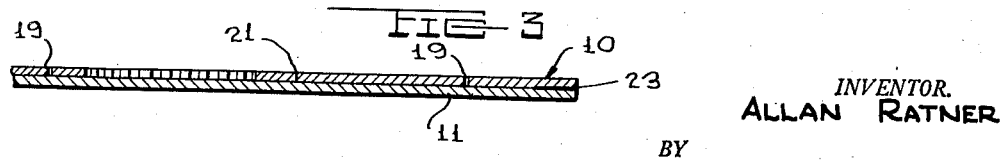
INVENTOR.
ALLAN RATNER
BY
McMorrow, Berman + Davidson
ATTORNEYS Patented Jan. 15, 1952

2,582,355

UNITED STATES PATENT OFFICE 2,582,355

DATE-REMINDER SHEET

Allan Ratner, Newark, N. J.

Application October 13, 1950, Serial No. 190,002

2 Claims. (Cl. 283—2)

This invention relates to calendars, and more particularly to a date-reminder sheet for selectively framing the day-indicating numerals of a monthly calendar.

An object of this invention is to provide a date-reminder sheet adapted for securement on a monthly calendar including areas in the form of flaps which are removable to provide openings serving as frames for emphasizing selected day-indicating numerals of the monthly calendar.

Another object of this invention is to provide a date-reminder sheet adapted for securement on a monthly calendar including removable flaps for emphasizing a present or future day-indicating numerals of the monthly calendar.

A further object of this invention is to provide a date-reminder sheet adapted for securement on a monthly calendar including flap areas for daily removal to emphasize the subjacent day-indicating numerals of the calendar, each of the areas being adapted to have advertising matter thereon whereby the user is reminded of the advertiser upon the removal of each of said areas.

A still further object of this invention is to provide a date-reminder sheet which is particularly adapted for securement to the monthly calendar sheets of a yearly calendar.

A still further object of this invention is to provide a new article of manufacture in the form of a date-reminder sheet which is relatively simple in structure and cheap to manufacture.

The above and still further objects and advantages of the present invention will become apparent upon consideration of the following detailed description of the invention, when taken in conjunction with the accompanying drawings, wherein:

Figure 1 is a front elevational view of the date-reminder sheet of the present invention, shown attached to a monthly calendar and having several flap areas removed, and one flap area partially removed;

Figure 2 is a rear elevational view of the date-reminder sheet of the present invention; and Figure 3 is a fragmentary sectional view taken along the line 3—3 of Figure 1.

Referring now more particularly to the drawings, wherein like reference numerals have been used throughout the several views to designate like parts, there is shown the date-reminder sheet of the present invention, generally designated by the reference numeral 10 overlying and supported on a monthly calendar sheet 11 having the usual rows of day or date indicating numerals thereon indicating the days of the month.

The date-reminder sheet is fabricated of a transparent plastic or paper-containing material of any desired color, the transparency of the material permitting the calendar numerals 12 to be seen therethrough. The sheet 10 is provided with the requisite number of horizontal, vertically spaced rows of 13, 14, 15, 16 and 17 of rectangular, laterally spaced removable areas or flaps, the flap areas of the rows being in registry with the subjacent numerals 12 of the calendar sheet 11.

Each flap area of each of the rows 13 to 17, inclusive, is provided with means for facilitating the manual removal thereof to thereby expose and frame the subjacent numeral of the calendar sheet 11. The means for facilitating the manual removal comprises a scored upper edge 18 of each of the flap areas, and a scored edge 19, the lower edge 20 and the remaining side edge 31 being cut and severed from the sheet to permit the user to manually grasp a selected area and effect removal thereof from the sheet 10 by tearing the same along the scored edges 18 and 19. As clearly shown in Figure 1, the area over one of the calendar numerals 12 can be removed by grasping the lower left-hand corner of the block area and exerting an upwardly directed pull thereon toward the upper right-hand corner of the block area.

Each of the block areas of the rows 13 to 17, inclusive, is adapted to receive printed advertising indicia thereon to thereby remind the user of the particular advertiser upon the daily removal of the block areas to expose the numerical indicia 12 of the particular day of the month. Upon effecting the removal of one of the areas, the numerical indicia 12 contiguous thereto is prominently framed and emphasized.

Contiguous to the marginal edges of the transparent sheet 10 there is provided an adhesive for effecting the securement of the sheet to the calendar sheet 11 with the block areas of the rows 13 to 17, inclusive, in registry with the adjacent indicia 12 of the calendar sheet 11. As clearly shown in Figure 2, any quick-drying glue, designated by the reference numeral 23, may be provided along the lower side edge of the sheet 10 and the end edges thereof.

In actual manufacture, the upper side edges of the transparent date-reminder sheet 10 can be bound integrally with the monthly calendar sheets of the yearly calendar. The securement of the date-reminder sheets to the adjacent one of the calendar sheets can be effected by means of the adhesive 23 and the assembly of the reminder sheets 10 with the calendar sheets 11 permits the user to frame any day of any month of the year.

Although only one embodiment of the date-reminder sheet of the present invention has been described, it is readily apparent that numerous modifications can be made without departing from the spirit of the invention as set forth in the appended claims.

What I claim is:

1. The combination with a month calendar sheet having horizontal rows of day-indicating numerals thereon, of a transparent sheet overlying the calendar sheet through which the day-indicating numerals are visible, said transparent sheet being formed with flap areas registered with the individual calendar numerals, said areas being defined by a pair of score-lines which intersect to define two adjacent sides of a flap and two cut lines which intersect to define the two other adjacent sides of a flap by means of which a portion of the flap is disconnected from the sheet, said portion being arranged to be grasped for tearing the flap from the sheet to form an opening in the sheet serving as a frame for the subjacent calendar numeral and directly exposing such numeral to view.

2. The combination with a month calendar sheet having rows of date-indicating numerals thereon, of a transparent sheet overlying the calendar sheet through which the calendar numerals are visible, said transparent sheet being formed with a plurality of flaps corresponding in number and location to the calendar numerals, said flaps being rectangular in form and being defined by two right angularly intersecting score lines defining two adjacent flap sides and by two right angularly intersecting cut lines defining the remaining two flap sides, said cut lines separating the flaps from the sheet and together defining a portion arranged to be grasped for selectively tearing the flaps from the transparent sheet along said score lines to define rectangular openings in the transparent sheet which expose the subjacent calendar numerals to direct view, with the edges of the openings framing the exposed numerals.

ALLAN RATNER.

REFERENCES CITED

The following references are of record in the file of this patent:

UNITED STATES PATENTS

| Number | Name | Date |
|---|---|---|
| 438,033 | Taylor | Oct. 7, 1890 |
| 816,553 | Becker | Apr. 3, 1906 |
| 1,592,711 | Acklin | July 13, 1926 |
| 2,179,168 | Alexander | Nov. 7, 1939 |